(12) United States Patent
Jiang et al.

(10) Patent No.: US 11,055,549 B2
(45) Date of Patent: Jul. 6, 2021

(54) NETWORK, SYSTEM AND METHOD FOR IMAGE PROCESSING

(71) Applicant: Fudan University, Shanghai (CN)

(72) Inventors: Yugang Jiang, Shanghai (CN); Yanwei Fu, Shanghai (CN); Changmao Cheng, Shanghai (CN); Xiangyang Xue, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 195 days.

(21) Appl. No.: 16/417,619

(22) Filed: May 20, 2019

(65) Prior Publication Data

US 2020/0026942 A1   Jan. 23, 2020

(51) Int. Cl.
*G06K 9/00* (2006.01)
*G06K 9/62* (2006.01)
(Continued)

(52) U.S. Cl.
CPC ....... *G06K 9/00979* (2013.01); *G06K 9/6217* (2013.01); *G06K 9/6286* (2013.01); *G06N 3/04* (2013.01)

(58) Field of Classification Search
CPC ............. G06K 9/00979; G06K 9/6217; G06K 9/6286; G06K 9/6273; G06K 9/6267;
(Continued)

(56) References Cited

U.S. PATENT DOCUMENTS

| | | | | |
|---|---|---|---|---|
| 2018/0293711 | A1* | 10/2018 | Vogels | .................. G06T 15/005 |
| 2019/0147602 | A1* | 5/2019 | Tao | ..................... G06K 9/00771 |
| | | | | 382/103 |
| 2019/0236451 | A1* | 8/2019 | Jaitly | ..................... G10L 15/22 |

OTHER PUBLICATIONS

BlockDrop: Dynamic Inference Paths in Residual Networks. IEEE Conference on Computer Vision and Pattern Recognition (CVPR), Salt Lake City, USA, Jun. 2018. (Spotlight) Zuxuan Wu, Tushar Nagarajan, Abhishek Kumar, Steven Rennie, Larry S. Davis, Kristen Grauman, Rogerio Feris.

* cited by examiner

*Primary Examiner* — Asghar H Bilgrami
(74) *Attorney, Agent, or Firm* — Brad Bertoglio; Intelink Law Group, P.C.

(57) ABSTRACT

A network for image processing is provided, and more particularly, for coarse-to-fine recognition of image processing. The network includes a shared convolution layer, and a first subnet and a second subnet both subsequent to the shared convolution layer; the first subnet comprises a first skipping module comprising one or more skip-dense blocks iteratively stacked with one or more transition layers, a first pooling layer subsequent to the first skipping module, and a first classification layer subsequent to the first pooling layer; the second subnet comprises a second skipping module comprising one or more skip-dense blocks iteratively stacked with one or more layers, a second pooling layer subsequent to the second skipping module, and a second classification layer subsequent to the second pooling layer; and wherein a skip-dense block of the second subnet is selected to guide a transition layer of the first subnet, and the level of the guiding skip-dense block is deeper than the level of the guided transition layer. This network is also related to a system and a method thereof.

18 Claims, 2 Drawing Sheets
(2 of 2 Drawing Sheet(s) Filed in Color)

(51) Int. Cl.
*G06N 3/04* (2006.01)
*G06N 3/063* (2006.01)
*G06N 3/08* (2006.01)

(58) Field of Classification Search
CPC .......... G06N 3/04; G06N 3/063; G06N 3/082; G06N 3/0454
See application file for complete search history.

NETWORK, SYSTEM AND METHOD FOR IMAGE PROCESSING

This application claims a priority to China patent application No. 201810479296.8, filed on May 18, 2018; the entire contents of which are incorporated herein by reference.

TECHNICAL FIELD

This disclosure is related to a network for image processing, and more particularly, for coarse-to-fine recognition of image processing. This disclosure is also related to a system and a method thereof.

BACKGROUND

There is considerable evidence showing that visual analysis takes place in a predominately and default coarse-to-fine sequence within the human brain. The coarse-to-fine perception is also proportional to the length of the cerebral circuit path, i.e. time. When an image is very quickly shown to a person, only very coarse visual stimuli can be perceived, which is usually of low spatial frequencies. Nevertheless, given a longer duration, fine-grained details with relatively higher spatial frequencies can be perceived.

The coarse-to-fine recognition process is natural and favored by researchers and it is very useful in real-world applications. "Feedback Networks" (Zamir etc., CVPR, 2017) developed a coarse-to-fine representation via recurrent convolutional operations; such that the current iteration's output gives a feedback to the prediction at the next iteration. "HD-CNN: hierarchical deep convolutional neural networks for large scale visual recognition" (Yan etc., ICCV, 2015) disclosed a hierarchical structure of classes by grouping fine categories into coarse classes and embedded deep CNNs into the category hierarchy for better fine-grained prediction.

Deep Architecture is widely used in coarse-to-fine recognition. Starting with the notable victory of AlexNet ("ImageNet Classification with Deep Convolutional Neural Networks", Krizhevsky etc., NIPS, 2012), ImageNet ("ImageNet: A large-scale hierarchical image database", Deng etc., CVPR, 2009) classification contest has boomed the exploration of deep CNN architectures. Later, deep Residual Networks (ResNets) which mapped lower-layer features into deeper layers by shortcut connections with element-wise addition is proposed ("Deep residual learning for image recognition", He etc., CVPR, 2016), making training up to hundreds or even thousands of layers feasible. Highway Networks devised shortcut connections with input-dependent gating units ("Highway networks", Srivastava etc., arXiv preprint arXiv: 1505.00387, 2015). Recently, a compact architecture called DenseNet that further integrated shortcut connections to make early layers concatenated to later layers is proposed ("Densely connected convolutional networks", Huang etc, CVPR, 2017). The simple dense connectivity pattern surprisingly achieves the state-of-the-art accuracy with fewer parameters.

Some efforts have also been made to bypass the computational cost of deep models in the testing stage, such as network compression and conditional computation (CC). The CC often refers to the input-dependent activation for neurons or unit blocks, resulting in partial involvement fashion for neural networks. The CC learns to drop some data points or blocks within a feature map and thus it can be taken as an adaptive variant of dropout. In "Estimating or propagating gradients through stochastic neurons for conditional computation" (Bengio etc., CoRR, abs/1308.3432, 2013) it is introduced Stochastic Times Smooth neurons as binary gates in a deep neural network and termed the straight-through estimator whose gradient is learned by heuristically back-propagating through the threshold function. In "Adaptive dropout for training deep neutral networks" (Ba etc., NIPS, 2013), it is proposed a 'standout' technique which uses an auxiliary binary belief network to compute the dropout probability for each node. In "Conditional computation in neutral networks for fast models" (Bengio etc., CoRR, abs/1511.06297, 2015), it tackled the problem of selectively activating blocks of units via reinforcement learning. Later, in "Changing model behavior at test-time using reinforcement learning" (Odena etc., CoRR ads/1702.07780, 2017), it is used a Recurrent Neural Network (RNN) controller to examine and constrain intermediate activations of a network at test-time. Further, "Spatially adaptive computation time for residual networks" (Figurnov etc., CVPR, 2017) incorporates attention into ResNets for learning an image-dependent early-stop policy in residual units, both in layer level and feature block level. Once stopped, the following layers in the same layer group will not be executed.

There is a need to provide a new and different mechanism for the coarse-to-fine recognition.

SUMMARY

In one aspect of the embodiments, it is provided a network for image processing, especially for coarse-to-fine recognition, including:
 a shared convolution layer,
 a first subnet and a second subnet both subsequent to the shared convolution layer;
  wherein the first subnet comprises
  a first skipping module comprising one or more skip-dense blocks iteratively stacked with one or more transition layers;
  a first pooling layer subsequent to the first skipping module, and
  a first classification layer subsequent to the first pooling layer,
  wherein the second subnet comprises
  a second skipping module comprising one or more skip-dense blocks iteratively stacked with one or more layers;
  a second pooling layer subsequent to the second skipping module, and
  a second classification layer subsequent to the second pooling layer,
  wherein a skip-dense block of the second subnet is selected to guide a transition layer of the first subnet, and the level of the guiding skip-dense block is deeper than the level of the guided transition layer.

In another aspect of certain embodiments, it is provided a system for image processing, especially for coarse-to-fine recognition, including an input device, a processor for processing the input data, and an output device for outputting the processed data; wherein the processor is configured to build a computing model including
 a shared convolution layer,
 a first subnet and a second subnet both subsequent to the shared convolution layer;

wherein the first subnet comprises
a first skipping module comprising one or more skip-dense blocks iteratively stacked with one or more transition layers;
a first pooling layer subsequent to the first skipping module, and
a first classification layer subsequent to the first pooling layer,
wherein the second subnet comprises
a second skipping module comprising one or more skip-dense blocks iteratively stacked with one or more layers;
a second pooling layer subsequent to the second skipping module, and
a second classification layer subsequent to the second pooling layer,
wherein a skip-dense block of the second subnet is selected to guide a transition layer of the first subnet, and the level of the guiding skip-dense block is deeper than the level of the guided transition layer.

In yet another aspect of certain embodiments, a method for image processing is provided, especially for coarse-to-fine recognition, including:
inputting the input data to a shared convolution layer,
outputting the output of the shared convolution layer to a first branch and a second subnet both subsequent to the shared convolution layer;
wherein the first subnet comprises
a first skipping module comprising one or more skip-dense blocks iteratively stacked with one or more transition layers;
a first pooling layer subsequent to the first skipping module, and
a first classification layer subsequent to the first pooling layer,
wherein the second subnet comprises
a second skipping module comprising one or more skip-dense blocks iteratively stacked with one or more layers;
a second pooling layer subsequent to the second skipping module, and
a second classification layer subsequent to the second pooling layer,
selecting a skip-dense block of the second subnet to guide a transition layer of the first subnet, and the level of the guiding skip-dense block is deeper than the level of the guided transition layer.

Preferably, the deepest skip-dense block of the second subnet is selected to guide the deepest transition layer of the first skipping subnet.

Preferably, the number of the transition layers is one less than the number of skip-dense blocks in the first skipping module, and/or the number of the transition layers is one less than the number of skip-dense blocks in the second skipping module.

Preferably, a first loss function module is added to the first subnets at its outputs, and a second loss function module is added to the second subnets at its outputs, while the parameters of the first and second loss function are different.

Preferably, each skip-dense block comprises one or more sub-blocks each having a gating module, a dense layer subsequent to the gating module, and a merge module subsequent to the dense layer while also short connected to the input of the sub-block.

Preferably, the first and second classification layers each is a linear classifier.

In contrast to the traditional methods of coarse-to-fine recognition, our two-branch model deals with coarse and fine-grained classes simultaneously. Additionally, our coarse-level categorization will guide the fine-level task.

Compared with the traditional feedback net, embodiments described herein create a coarse-to-fine formulation in a feedforward fashion.

Different from the shortcut connections used in DenseNets and ResNets, our layer-skipping mechanism is learned to predict whether skipping one particular layer in the testing stage.

Compared with conditional computation, our layer-skipping mechanism is different in two points: (1) CC learns to drop out some units in feature maps, whilst our gating module learns to predict whether skipping the layers. (2) CC usually employs reinforcement learning algorithms which have in-differentiable loss functions and need huge computational cost for policy search; in contrast, our gating module is a differentiable function which can be used for individual layers in our network.

BRIEF DESCRIPTION OF DRAWINGS

The patent or application file contains at least one drawing executed in color. Copies of this patent or patent application publication with color drawing(s) will be provided by the Office upon request and payment of the necessary fee.

The foregoing summary, as well as the following detailed description, will be better understood when read in conjunction with the appended drawings. For the purpose of illustration, there are shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Figure 1:
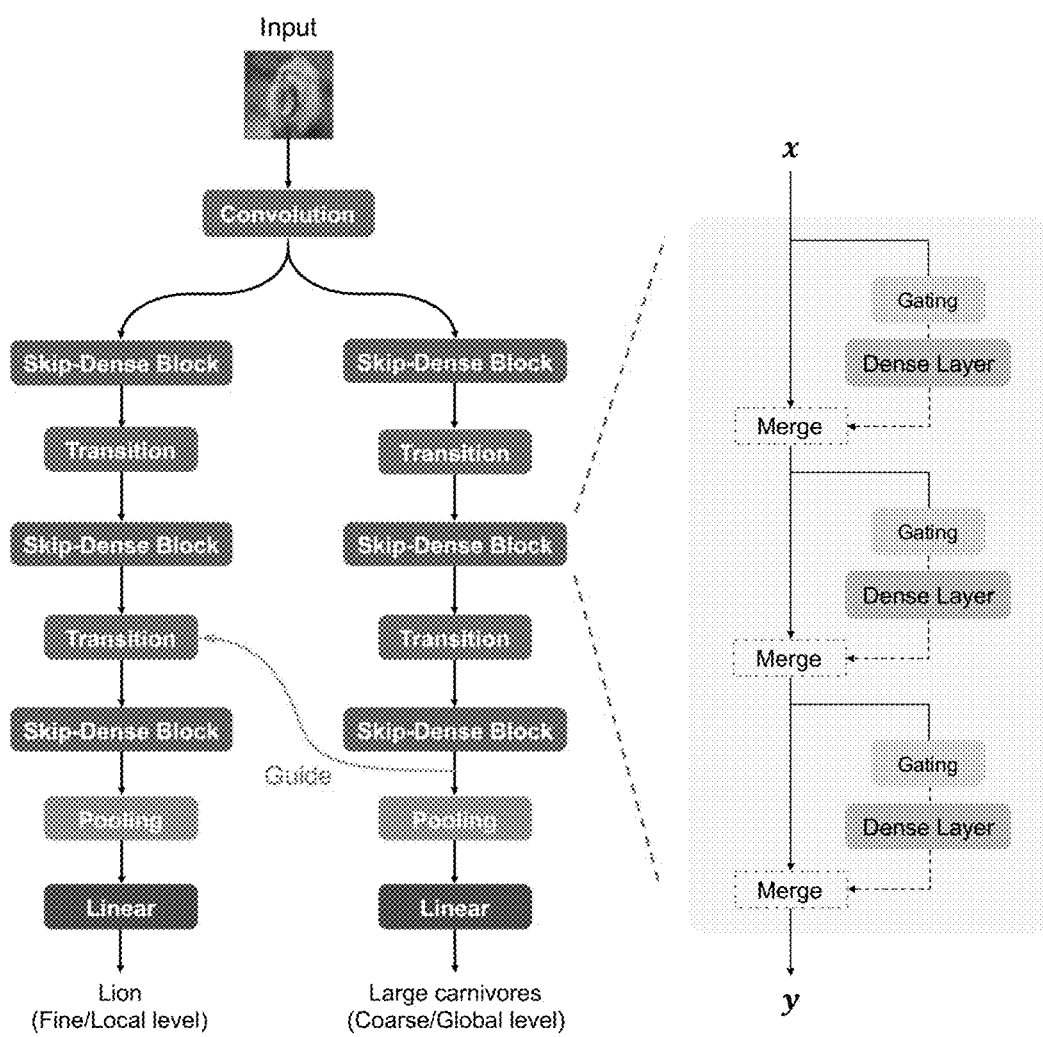
Figure 2:
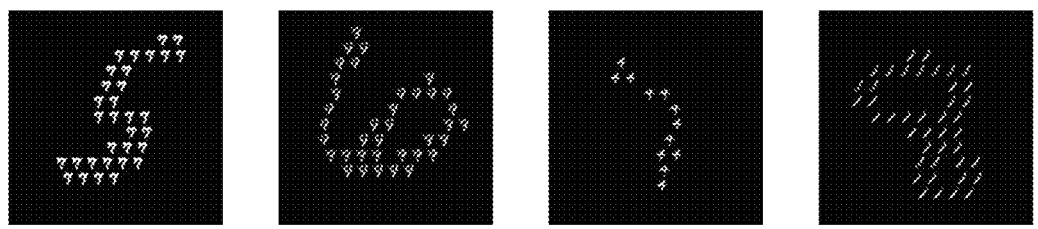
Figure 3:
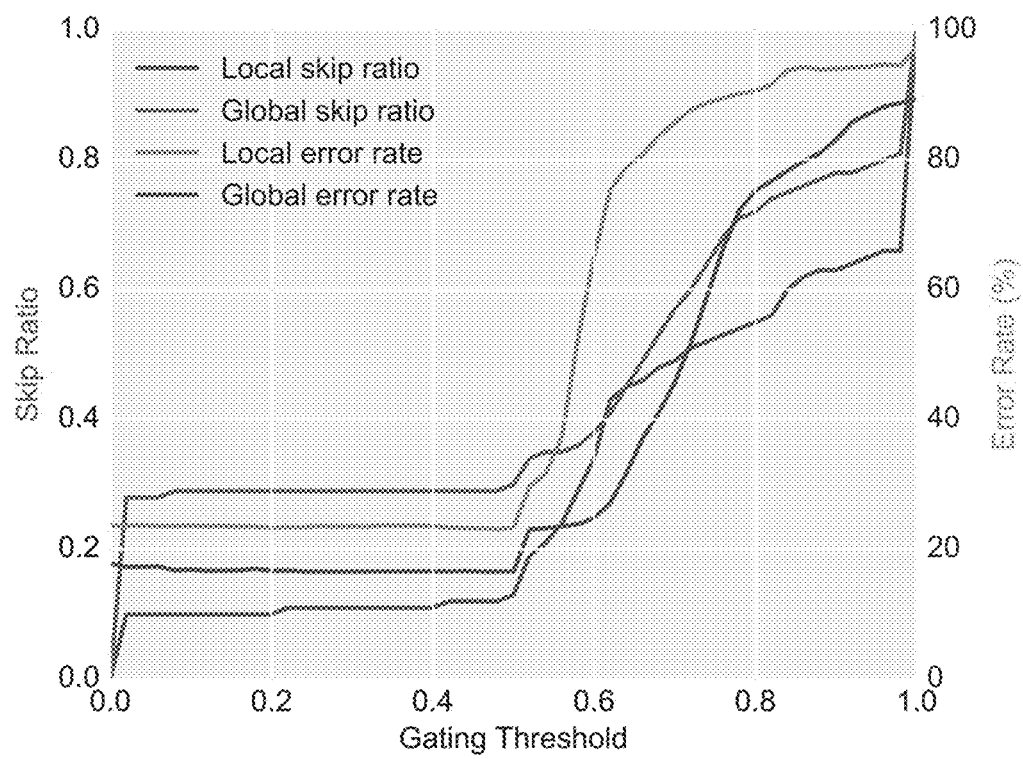
Figure 4:
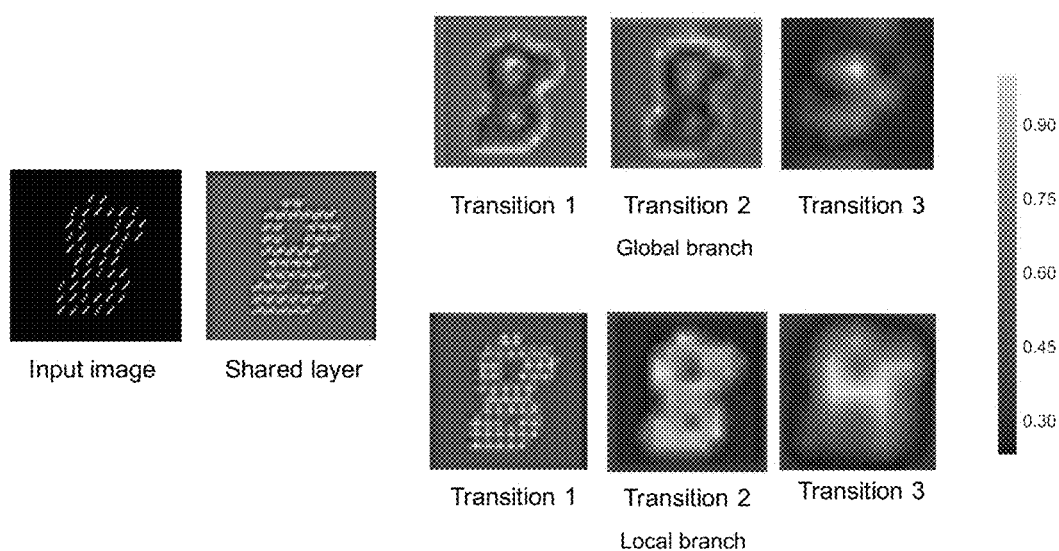

Wherein:

FIG. 1 shows an imaging processing network of an embodiment according to an embodiment;

FIG. 2 shows an illustrated examples of sb-MNIST dataset used in the experiment of an embodiment;

FIG. 3 shows the Local and Global layer-skipping ratios and error rates under different gating thresholds in the experiment of an embodiment; and FIG. 4 shows feature visualization at shared and transition layers for Global and Local branches in the experiment of an embodiment.

DETAILED DESCRIPTION

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 1 shows the imaging processing network in accordance with one embodiment of this invention. The two subsets are shared with the same visual inputs and the same convolutional layer. Each subset comprises several skip-dense blocks, several transition layers, a pooling layer and a classification layer.

As can be seen in FIG. 1, an input image is firstly processed by the convolutional layer to extract the low-level visual signal. The two left and right subnets solve the fine-grained and coarse classification respectively. Both the left and right subnets are almost the same in the general structure.

Each subnet is stacked mainly by skip-dense blocks and transition layers iteratively. In the illustrative embodiment, the number of skip-dense blocks in each subnet is three. However, it is to be understood that other numbers are also acceptable, like two or four. It is also to be understood that the number of skip-dense blocks in the left subnet does not necessarily equal to that in the right subnets. In a preferred embodiment, the number of the transition layers is always one less than the number of skip-dense blocks, so that it looks like that skip-dense blocks are sandwiching transition layers. In another preferred embodiment, the number of the transition layers equals to the number of skip-dense blocks.

Each transition has convolutional operations with 1×1 filter size and pooling, which aims at changing the number and spatial size of feature maps for the next skip-dense block.

The global average pooling and classification layers linear classifier are added at the deep level of each branch for the prediction tasks. The classification layer is preferably a linear classifier.

Loss function module (not shown) are added to each subnets at their outputs. In the illustrative embodiment, cross-entropy loss (or log loss), measures the performance of a classification model whose output is a probability value between 0 and 1. Cross-entropy loss increases as the predicted probability diverges from the actual label. In the illustrative embodiment, the parameters of the left and right loss function are different. The loss functions can so back-propagate that the left and the subnets are of asymmetry. As seen from FIG. 1, the left subnet outputs e.g. a lion in fine/local level, while the right subnet output e.g. a large carnivores in coarse/global level.

The skip-dense block is defined as a level of visual concept abstraction. As in the right part of FIG. 1, it is given the structure details of a skip-dense block. For the input pattern "x" from a shallower abstraction level, a shortcut connection is applied after each dense layer. And the option of information flowing through each dense layer is checked by a cheap gating module which is input-dependent. The gating module is learned whether to block the information flow passing to dense layer. The output pattern "y" is then processed into the next transition layer and entered into the next abstraction level.

For example, when "x" is the input, the gating function gives a prediction value p=gating(x) between 0 and 1. In the training p is directly multiplied with dense_layer(x), and then merged with the original "x", such that the output is merge (x, p*dense_layer(x)). The merge function could be x+p*dense_layer(x) or [x, p*dense_layer(x)]. In the testing step, if p>0.5, then it flows through dense_layer(x); otherwise, dense_layer(x) will be skipped.

As seen from FIG. 1, the skip-dense block comprises three sub-blocks, each having a gating module, a dense layer subsequent to the gating module, as well as a merge module having a short connection with the input. It is to be understood that the skip-dense block could comprises one or more such sub-blocks. In different embodiments, the number of the sub-blocks could be different.

The dense layer is a type of convolutional layers coming from DenseNet or ResNet. The difference between DenseNet and ResNet comes from the different combination methods of shortcut connections, namely merge functions here. Therefore, the merge operation of preceding layers can be channel concatenation or element-wise addition, used in DenseNets and ResNets respectively. Preferably, a pre-activation unit (not shown) facilitating both of the merge functions are also used. In general, the dense connectivity pattern enables any layer to more easily access proceeding layers and thus make individual layers additionally supervised from the shorter connections.

Residual networks have been found behaving like ensembling numerous shallower paths. Idling few layers in these networks may not dramatically degrade the performance. Intuitively, the tremendous number of hidden paths may be redundant; an efficient path selection mechanism is essential if we want to reduce the computational cost in the testing stage. Mathematically, there are exponentially many hidden paths in these networks. For example, for L dense layers, we can obtain 2 L hidden paths. Dynamic path selection could pursue the specialized and flexible formations of nested convolution operations.

The gating module is introduced for path selection. Particularly, the gating module is learned to judge whether or not skipping the convolutional layer from the training data. It can also be taken as one special type of regularizations: the gating module should be inclined not to skip too many layers if the input data is complex and vice versa. Here, it is used a N×1 fully-connected layer for the N-dimensional input features and then a threshold function is applied to the scalar output. The input features are preprocessed by average pooling in practice. The parameters of the fully-connected layer are learned from the training set and the threshold function is designed to control the learning process.

The policy of designing and training the threshold function as an estimator is very critical to the success of the skipping mechanism. The magnitude of a unit often determines its importance for the categorization task in CNNs. Based on this, it is derived a simple end-to-end training scheme for the entire network. Specifically, the output of threshold function is multiplied with each unit of the convolutional layer output, which affects the layer importance of categorization.

The key ingredient of gating module is the threshold function. Given an activation or input, the threshold function needs to judge whether skipping the following dense layer or not as in the right part of FIG. 1. Intuitively, the threshold function performs as a binary classifier. In the illustrated embodiment, it is chosen a hard sigmoid function $$\text{hard sigm}(x)=\max(0,\min(kx+\tfrac{1}{2},1)) \quad (1)$$

for its first derivative in (0, 1) keeps constant, which encourages more flexible path searching compared with the sigmoid function. Besides, for the outputs clipped to 0 or 1, a straight-through estimator is used to make the error back-propagated through the threshold function. Thus it is always differentiable.

The slope variable k is the key parameter to determine the output scaling of dense layers. The k is initialized at 1 and increased by a fixed value every epoch. As results, the learned curve of gating will be slope enough to make the outputs of gating module either 0 or 1 in the training process. It can be used as an approximation of step function that emits binary decisions. However, the large slope variable would make the weight training of gating modules unstable. Again, it is used the straight-through estimator to keep k equal to one in backward mode.

The mutual adjustment and regularization of gating and dense layers abbreviate the problem of training difficulty and hard convergence of reinforcement learning. The gating module makes discrete binary decisions to save computation.

The faster coarse/global subnet can guide the slower fine/local subnet with global context information of objects in a top-down fashion, inspired from the LSF-based top-down facilitation of recognition in the visual cortex. In the preferred embodiment, the output features of the last skip-dense block in the coarse branch is selected to guide the last transition layer in the fine branch. More specifically, the output features are bilinear upsampled and concatenated into the input features of the last transition layer in the local subnet. The injection of feedback information from the coarse level can be beneficial for the fine-grained object categorization.

It is understandable that the output features of a precedent, other than the last, skip-dense block can also be optionally selected to guide the last transition layer in the fine branch; and it can be another, but not the last, transition layer to be guided, too. Preferably, the level of the guiding skip-dense block is higher than the level of the guided transition layer.

The above embodiments are illustrated on the focus of the network of this invention. It should be noted that the system and the method of this invention are corresponding to the network. The embodiments for the network are also suitable for the system and the method. For the purpose of conciseness, the system and the method of this invention are no more illustrated here.

Experiments

Experiments have been conducted on four datasets, namely sb-MNIST, CIFAR-100, CUB-200-2011 and Stanford Cars.

Sb-MNIST dataset is built by randomly selecting two images from MNIST dataset and using the first one as the local figure to construct the second one. 120,000 training images and 20,000 testing images have been generated for building the dataset. FIG. 2 shows the illustrated examples of sb-MNIST dataset. Each "big" figure (number) is composed of copies of a "small" figure.

CIFAR-100 dataset has 60,000 images from 100 fine-grained classes, which are further divided into 20 coarse-level classes. The image size is 32×32. The standard training/testing Split according to "Learning Multiple Layers of Features from Tiny Images" (Krizhevsky, 2009) is used.

CUB-200-2011 dataset contains 11,788 bird images of 200 fine-grained classes. Strictly following the biological taxonomy, 39 coarse labels are collected in total by the family names of the 200 bird species. For instance, the black-footed albatrosses belong to Diomedeidae family. The default training/testing split of this dataset is used.

Stanford Cars dataset is another fine-grained classification dataset. It contains 16,185 car images of 196 fine classes (e.g. Tesla Model S Sedan 2012 or Audi S5 Coupe 2012) which describe the properties such as Maker, Model, Year of the car. It can be categorized into 7 coarse classes containing Sedan, SUV, Coupe, Convertible, Pickup, Hatchback and Wagon. The default training/test split of the dataset is used here.

The following baselines have been compared with:
(1) Feedback Net: as the only work of enabling the coarse-to-fine classification, it is a feedback based learning architecture in which each representation is formed in an iterative manner based on the feedback received from previous iteration's output. The network is instantiated using existing RNNs. Thus Feedback Net has a better classification performance than the standard CNNs.
(2) DenseNet: DenseNet connects each layer to all of its preceding layers in a feedforward fashion;
(3) ResNet: it is an extension of traditional CNNs by learning the residual of each layer to enable the network of being trained substantially deeper than previous CNNs.

Compared with these baselines, two of most distinctive components of certain embodiments are: the gating module to skip some layers dynamically and the two-branch structure for solving the coarse-to-fine classification.

The types of merge function of our preferred embodiment can be channel concatenation or element-wise addition, ("Concat" and "Add" for short). In the experiments, it is configured based on Concat merge type, namely DenseNets as default. The shared convolution layer with output channels of twice the growth rate is performed to the input visual images. The outputs of skipped dense layers are replaced with features maps of the same size filled with zero at inference.

For sb-MNIST, it is configured 4 skip-dense blocks each with 3 dense layers and a growth rate as 6. Guide link for sb-MNIST dataset is not used.

For CIFAR-100, our model is verified with different model settings. Two settings of Concat merge type are based on DenseNet-40 and DenseNet-BC-100, denoted as Concat-40 and Concat-BC-100 respectively. Results of our model with Add merge type are also reported. Referred as Add-166, the model is built very similar to ResNet-164, except for Add-166 including two extra transition layers. Data preprocessing procedure and initializations follow "Densely connected convolutional networks" (Huang etc., CVPR, 2017) and "Identity mapping in deep residual networks" (He Etc., ECCV, 2016).

For CUB-200-2011 and Stanford Cars, our model is built on DenseNet-121. The input images are resized to 360×360 for training and test on both datasets. The ImageNet pre-trained DenseNet-121 weights are incorporated into our model as network initialization. Mini-batch size is set to 16, learning rate is started with 0.01. To save GPU memory, the memory-efficient implementation of DenseNets is used here. The experiments are conducted without using any bounding boxes or part annotations.

All of our models are trained using SGD with a cosine annealing learning rate schedule and Nesterov momentum of 0.9 without dampening. The models are trained jointly with or without gating modules, then fine-tuned with gating. It is found that joint training as a start speeds up the whole process and makes the performance more stable. Gradient clipping is done with L2 norm threshold 1.0 for avoiding gradient explosion. For the gating modules, outputs of which are all 0 or 1 in a batch, auxiliary binary cross entropy loss is applied on them to guarantee functioning of the gating modules. All the code is implemented in PyTorch and run on Linux machines equipped with the NVIDIA GeForce GTX 1080Ti graphics cards.

The results on sb-MNIST dataset are compared in Table 1 (see below). The "Local" and "Global" indicate the classification of "small" figures and "big" figures. On this dataset, DenseNet, ResNet and LeNet (see "Gradient-based learning applied to document recognition", LeCun etc., Proceedings of the IEEE, 86(11), 1998) are run separately for the both "Local" and "Global" tasks. The classification of "small" and "big" figures in the image corresponds to the identification task of high and low spatial frequency processing. This dataset gives a general understanding thereof.

TABLE 1

Results on sb-MNIST dataset

| Methods | Accuracy (%) | |
|---|---|---|
| | Local | Global |
| LeNet | 90.3 | 70.2 |
| DenseNet | 98.3 | 97.2 |
| ResNet | 98.1 | 96.8 |
| Ours | 99.1 | 99.1 |

As shown in Table 1, our network has 17 layers and averagely about 20% layers can be skipped in the testing step. DenseNet and ResNet have 40 and 18 layers respectively.

Judging from the results in Tab. 1, our model outperforms other methods by a clear margin. It is largely due to two reasons. Firstly, the skip-dense blocks can efficiently learn the visual concepts; secondly, the gating module learns to find optimal path routing for avoiding suffering from both overfitting and underfitting. The performance of original version LeNet is greatly suffered from the small number of layers and convolutional filters while DenseNet and ResNet show slight overfitting. Averagely, our model uses 76% of all the parameters as 15% and 31% of dense layers in "Local" and "Global" branches are skipped. Due to a portion of layers skipped in testing step, the total running time and running cost are lowered.

The results of CIFAR-100 is shown in Table 2, wherein Feedback Net, DenseNet and ResNet as well as other previous works are compared. The "Local" and "Global" indicate the classification tasks at fine-grained and coarse levels individually. DenseNet and ResNet are run separately for the "Local" and "Global" tasks respectively.

TABLE 2

Results of CIFAR-100

| Methods | Accuracy (%) | | Params |
|---|---|---|---|
| | Local | Global | |
| Snoek's | 72.6 | — | — |
| All-CNN | 66.3 | — | — |
| Net-in-Net | 64.3 | — | — |
| Deeply Sup. Net | 65.4 | — | — |
| FractalNet | 76.7 | — | 38.6M |
| Highway | 67.6 | — | — |
| Feedback Net | 71.1 | 80.8 | 1.9M |
| DenseNet-40 | 75.6 | 80.9 | 1.0M × 2 |
| DenseNet-BC-100 | 77.7 | 83.0 | 0.8M × 2 |
| ResNet-164 | 75.7 | 81.4 | 1.7M × 7 |
| Concat-40 | 75.4 | 82.9 | 0.9M + 0.7M |
| Concat-BC-100 | 76.9 | 83.4 | 0.7M + 0.6M |
| Add-166 | 75.8 | 82.5 | 1.5M + 0.5M |

As shown in Tab. 2, the virtual depth of Feedback Net is 48, indicating the number of unfolded layers in Feedback-Net. "Snoek's" refers to "Scalable Bayesian optimization using deep neural networks" (Snoek etc., ICML, 2014). "x2" indicates two separate branches for two tasks. "a+b" in the "Params" column represents the averagely used parameters "a", "b" in Local and Global branches of our models.

In Table 2, our models outperform several baselines and show comparable performances to the corresponding base models with much less computational cost. Compared with the Feedback Net, Concat-40 gains the accuracy margins of 4.3% and 2.1% on "Local" and "Global" individually with relatively fewer parameters. This implies that our network has the better capability of learning the coarse-to-fine information by the two branches. Though Feedback Net has a shallower physical depth 12, it contains more parameters and consumes more computation cost. This difference is largely caused by the different architectures of two types of networks: Feedback Net is built upon the recurrent neural network, while our network is a forward network with the strategy of skipping some layers. Thus, our network is more efficient in term of computational cost and running time.

On the "Global" task, our network can still achieve a modest improvement over other baselines. One possible explanation is that since the "Global" task is relatively easy, the networks with standard layers may tend to overfit the training data; in contrast, our gating module can skip some layers for better regularization.

Results on CUB-200-2011 dataset is compare in Table 3; and results on Stanford cars dataset is compare in Table 4.

TABLE 3

Results on CUB-200-2011

| Methods | Accuracy (%) | | Params |
|---|---|---|---|
| | Local | Global | |
| DenseNet-121 | 81.9 | 92.3 | 8M × 2 |
| ResNet-34 | 79.3 | 91.8 | 22M × 2 |
| MG-CNN | 81.7 | — | ≥144M |
| Bilinear-CNN | 84.1 | — | ≥144M |
| RA-CNN (scale 1 + 2) | 84.7 | — | ≥144M |
| RA-CNN (scale 1 + 2 + 3) | 85.3 | — | ≥144M |
| Ours | 84.9 | 93.4 | 6M + 5M |

TABLE 4

Results on Stanford Cars

| Methods | Accuracy (%) | | Params |
|---|---|---|---|
| | Local | Global | |
| Feedback Net | 53.4 | 87.4 | 1.5M |
| DenseNet-121 | 90.5 | 92.8 | 8M × 2 |
| ResNet-34 | 89.3 | 92.0 | 22M × 2 |
| Bilinear-CNN | 91.3 | — | ≥144M |
| RA-CNN (scale 1 + 2) | 91.8 | — | ≥144M |
| RA-CNN (scale 1 + 2 + 3) | 92.5 | — | ≥144M |
| Ours | 92.0 | 93.8 | 6M + 5M |

The "Local" and "Global" tasks still refer to the fine-grained and coarse-level classification. Our model uses 121 layers and averagely about 30% and about 13% of dense layers of global and local branches can be skipped in the testing step.

On the coarse classification, our result is better than those baselines. On the fine-grained task, our models achieve results comparable to the state-of-the-art with much fewer parameters. On CUB-200-2011 dataset, our result is still better than that of MG-CNN, Bilinear-CNN and RA-CNN (scale 1+2) which employ multiple VGG networks for classification, showing the effectiveness of our compact structure. Comparably, each sub-network of Bilinear-CNN uses the pre-trained VGG network and there is no information flow between two networks until the final fusion layer.

In the experiment some ablation studies is also conducted to further evaluate and explain the impacts on performances by choosing key settings in our models.

Different choices of merge types and gating functions are compared. For merge types, Concat-BC-100 and Add-166 are used for Concat and Add types respectively since the two models have roughly the same number of bottleneck dense layers. For gating functions, we compare the proposed hard sigm with $$\text{soft } sigm(x) = \frac{1}{1 + e^{-x}}$$

The results are compared in Table 5. Two evaluation metrics have been used here, namely accuracy and skip ratio. The skip ratio is computed by the number of skipped layers dividing the total number of dense layers in each individual branch.

TABLE 5

Ablation study on CIFAR-100 dataset

| | | Accuracy (%) | | Skip Ratio (%) | |
|---|---|---|---|---|---|
| Merge | Gating | Local | Global | Local | Global |
| concat | hard | 76.9 | 83.4 | 15.3 | 29.7 |
| | soft | 73.8 | 79.7 | 15.4 | 30.5 |
| add | hard | 75.8 | 82.5 | 10.4 | 39.8 |
| | soft | 74.2 | 83.1 | 6.1 | 23.5 |

As seen in Table 5, "concat", "add", "hard", "soft" indicate the channel concatenation, element-wise addition, soft sigmoid function and hard sigmoid function.

Judging from the results in Table 5, the combination of channel concatenation for merge and gating via hard sigmoid is our best network configuration as it achieves the best performance with the fewest parameters. Besides, it is noticed that hard sigm is generally better than soft sigm for both merge types on most cases, indicating that the former possesses a stronger ability of routing path searching.

The skip ratios on "Local" and "Global" tasks is compared. In testing stages, the coarse branch of our network will skip much more layers than its sibling fine branch. This is largely due to the fact that the "Global" task is easy, and using relative a few layers of coarse branch is good enough to grasp the coarse-level information.

To further verify the flexibility of our model, the Concat-BC-100 model is taken with hard sigm for gating as the study object since it achieves the excellent performance with very few parameters.

FIG. 3 shows the Local and Global layer-skipping ratios and error rates under different gating thresholds. The slope variable is properly scaled for the smooth change of the skip ratios. The threshold of gating module which can affect the layer-skipping ratios and error rates of "Local" and "Global" tasks is varied, as shown in FIG. 3.

From the results, we can conclude that both branches are capable of producing acceptable accuracy within a certain range of gating thresholds. As expected, the optimal range of skip ratios for two branches are not same due to the different granularity level of recognition tasks. For the Global branch, 0%-35% is the optimal skip ratio range. For the Local branch, 0%-20% is the optimal skip ratio range, which is more strict than the Global branch. The good thing is that the learned gating module at each dense layer makes the performance of two branches keep consistent under various user-defined thresholds. As the gating threshold value is raised above 0.5, the skip ratios of two branches increase rapidly and the error rates rise synchronously, meaning that the network becomes disordered and weak in expressivity.

It is also noticed that the performances of two trained branches without or with little layer skipping keep almost undamaged even we train the full network with gating when fine-tuning. We conjecture two reasons behind this intriguing phenomenon. First, the shortcut connections make the model very stable and robust to the fine weight updating. The second reason is that there still exist some data samples using the whole dense layers when training with gating.

FIG. 4 shows feature visualization at shared and transition layers for Global and Local branches. Investigating the responses of intermediate feature maps at different abstraction levels facilitates the understanding on neural networks. Especially, the asymmetry of two branches leads to discrepant manipulations on the given input. Here, feature visualization is done on different abstraction levels. Technically, the output features are extracted from the first shared convolutional layer and transition layers of two branches. Then the absolute values of the feature maps are applied over by channel-wise average pooling and scaled to [0, 1] for visualization.

A case study on sb-MNIST dataset is shown in FIG. 4. From the visualization results, we can observe that the first shared features hold both global and local information. Then Global branch cares more about global context information and grasps the shape or style of big figure "8" very quickly at transition layer "1" and "2". Then the transformed features at transition layer "3" of the Global branch represent the semantic information of the big figure. While the Local branch focuses more on the local details of the big figure and neglects the background instantly at transition layer "1". And it keeps the shape of the big figure "8" almost unchanged until the last transition layer, which means the Local branch does not learn the pattern of the big figure. Instead, it transforms the local details, namely the features of small figures, into the final representation.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A network of image processing, especially for coarse-to-fine recognition, comprising:
    a shared convolution layer; and
    a first subnet and a second subnet both subsequent to the shared convolution layer;
    wherein the first subnet comprises
        a first skipping module comprising one or more skip-dense blocks iteratively stacked with one or more transition layers;
        a first pooling layer subsequent to the first skipping module, and
        a first classification layer subsequent to the first pooling layer;

wherein the second subnet comprises
a second skipping module comprising one or more skip-dense blocks iteratively stacked with one or more layers;
a second pooling layer subsequent to the second skipping module, and
a second classification layer subsequent to the second pooling layer; and
wherein a skip-dense block of the second subnet is selected to guide a transition layer of the first subnet, and the level of the guiding skip-dense block is deeper than the level of the guided transition layer.

2. The network of claim 1, wherein the deepest skip-dense block of the second subnet is selected to guide the deepest transition layer of the first skipping subnet.

3. The network of claim 1, wherein the number of the transition layers is one less than the number of skip-dense blocks in the first skipping module, and/or the number of the transition layers is one less than the number of skip-dense blocks in the second skipping module.

4. The network of claim 1, wherein a first loss function module is added to the first subnets at its outputs, and a second loss function module is added to the second subnets at its outputs, while the parameters of the first and second loss function are different.

5. The network of claim 1, wherein each said skip-dense block comprises one or more sub-blocks each having a gating module, a dense layer subsequent to the gating module, and a merge module subsequent to the dense layer while also short connected to the input of the sub-block.

6. The network of claim 1, wherein the first and second classification layers are linear classifiers.

7. A system of image processing, especially for coarse-to-fine recognition, comprising an input device, a processor for processing the input data, and an output device for outputting the processed data; wherein the processor is configured to build a computing model comprising:
a shared convolution layer,
a first subnet and a second subnet both subsequent to the shared convolution layer;
wherein the first subnet comprises
a first skipping module comprising one or more skip-dense blocks iteratively stacked with one or more transition layers;
a first pooling layer subsequent to the first skipping module, and
a first classification layer subsequent to the first pooling layer,
wherein the second subnet comprises
a second skipping module comprising one or more skip-dense blocks iteratively stacked with one or more layers;
a second pooling layer subsequent to the second skipping module, and
a second classification layer subsequent to the second pooling layer,
wherein a skip-dense block of the second subnet is selected to guide a transition layer of the first subnet, and the level of the guiding skip-dense block is deeper than the level of the guided transition layer.

8. The system of claim 7, wherein the deepest skip-dense block of the second subnet is selected to guide the deepest transition layer of the first skipping subnet.

9. The system of claim 7, wherein the number of transition layers is one less than the number of skip-dense blocks in the first skipping module, and/or the number of the transition layers is one less than the number of skip-dense blocks in the second skipping module.

10. The system of claim 7, wherein a first loss function module is added to the first subnets at its outputs, and a second loss function module is added to the second subnets at its outputs, while the parameters of the first and second loss function are different.

11. The system of claim 7, wherein each said skip-dense block comprises one or more sub-blocks each having a gating module, a dense layer subsequent to the gating module, and a merge module subsequent to the dense layer while also short connected to the input of the sub-block.

12. The system of claim 7, wherein the first and second classification layers are linear classifiers.

13. A method of image processing, especially for coarse-to-fine recognition, comprising the steps of:
inputting input data to a shared convolution layer;
outputting an output of the shared convolution layer to a first subnet and a second subnet both subsequent to the shared convolution layer;
wherein the first subnet comprises
a first skipping module comprising one or more skip-dense blocks iteratively stacked with one or more transition layers;
a first pooling layer subsequent to the first skipping module, and
a first classification layer subsequent to the first pooling layer,
wherein the second subnet comprises
a second skipping module comprising one or more skip-dense blocks iteratively stacked with one or more layers;
a second pooling layer subsequent to the second skipping module, and
a second classification layer subsequent to the second pooling layer; and
selecting a skip-dense block of the second subnet to guide a transition layer of the first subnet, and the level of the guiding skip-dense block is deeper than the level of the guided transition layer.

14. The method of claim 13, wherein the step of selecting includes selecting the deepest skip-dense block of the second subnet to guide the deepest transition layer of the first skipping subnet.

15. The method of claim 13, wherein the number of the transition layers is one less than the number of skip-dense blocks in the first skipping module, and/or the number of the transition layers is one less than the number of skip-dense blocks in the second skipping module.

16. The method of claim 13, wherein a first loss function module is added to the first subnets at its outputs, and a second loss function module is added to the second subnets at its outputs, while the parameters of the first and second loss function are different.

17. The method of claim 13, wherein each skip-dense block comprises one or more sub-blocks each having a gating module, a dense layer subsequent to the gating module, and a merge module subsequent to the dense layer while also short connected to the input of the sub-block.

18. The method of claim 13, wherein the first and second classification layers are linear classifiers.

* * * * *